US011772912B2

(12) United States Patent
Flixeder et al.

(10) Patent No.: US 11,772,912 B2
(45) Date of Patent: Oct. 3, 2023

(54) METHOD FOR OPERATING A TRANSPORT SYSTEM IN THE FORM OF A LONG-STATOR LINEAR MOTOR

(71) Applicant: B&R INDUSTRIAL AUTOMATION GMBH, Eggelsberg (AT)

(72) Inventors: Stefan Flixeder, Eggelsberg (AT); Benjamin Reichenwallner, Eggelsberg (AT); Michael Hauer, Eggelsberg (AT); Birgit Zimmer, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 17/703,407

(22) Filed: Mar. 24, 2022

(65) Prior Publication Data
US 2022/0306406 A1    Sep. 29, 2022

(30) Foreign Application Priority Data

Mar. 25, 2021    (AT) .............................. A 50212/2021

(51) Int. Cl.
*B65G 54/02*    (2006.01)
*H02P 25/064*    (2016.01)
(Continued)

(52) U.S. Cl.
CPC ............. *B65G 54/02* (2013.01); *B65G 43/02* (2013.01); *H02K 41/031* (2013.01); *H02P 3/22* (2013.01);
(Continued)

(58) Field of Classification Search
CPC ...... B65G 54/02; B65G 43/02; H02K 41/031; H02P 3/22; H02P 25/006
(Continued)

(56) References Cited

U.S. PATENT DOCUMENTS 9,202,719 B2    12/2015 Lu et al.
9,806,647 B2    10/2017 Prüssmeier et al.
(Continued)

FOREIGN PATENT DOCUMENTS

DE    10 2015 102 236    8/2016
EP    3 109 998    12/2016
(Continued)

OTHER PUBLICATIONS

Austria Search Report conducted in counterpart Austria Appln. No. A 50212/2021 (dated Mar. 24, 2022).
(Continued)

*Primary Examiner* — James R Bidwell
(74) *Attorney, Agent, or Firm* — GREENBLUM & BERNSTEIN, P.L.C.

(57) ABSTRACT

A transport system in the form of a long-stator linear motor and method for operating a transport system in the form of a long-stator linear motor including a stator on which a plurality of magnetic-field-generating units is arranged and a plurality of transport units which are moved along the stator simultaneously. In an event of a system error in a part of the transport system, the method includes defining an error area on the stator that includes only a part of the stator with a defective part of the transport system, and transferring the magnetic-field-generating units within the defined error area to a specified error state.

15 Claims, 5 Drawing Sheets

(51) Int. Cl.
  *B65G 43/02* (2006.01)
  *H02K 41/03* (2006.01)
  *H02P 3/22* (2006.01)

(52) U.S. Cl.
  CPC .... *H02P 25/064* (2016.02); *B65G 2203/0283* (2013.01)

(58) Field of Classification Search
  USPC .......................................................... 198/805
  See application file for complete search history.

(56) References Cited

U.S. PATENT DOCUMENTS

| | | | |
|---|---|---|---|
| 10,978,969 | B2 | 4/2021 | Weber et al. |
| 2016/0114989 | A1* | 4/2016 | Hibbs ............... H01L 21/67736 |
| | | | 414/800 |
| 2020/0148481 | A1 | 5/2020 | Huang |
| 2020/0171958 | A1* | 6/2020 | Huang .................... B60L 13/10 |
| 2021/0402881 | A1 | 12/2021 | Hanis et al. |

FOREIGN PATENT DOCUMENTS

| | | | |
|---|---|---|---|
| EP | 3 202 612 | | 8/2017 |
| EP | 3 581 428 | | 12/2019 |
| EP | 3 582 376 | | 12/2019 |
| EP | 3 653 428 | | 5/2020 |
| JP | 2020-25388 | | 2/2020 |
| WO | 92/00862 | | 1/1992 |
| WO | 2015/042409 | | 3/2015 |
| WO | 2018/108408 | * | 6/2018 ............. H02N 15/00 |

OTHER PUBLICATIONS

Europe Search Report/Office Action conducted in counterpart Europe Appln. No. EP 22161524 (dated Aug. 12, 2022).

* cited by examiner

METHOD FOR OPERATING A TRANSPORT SYSTEM IN THE FORM OF A LONG-STATOR LINEAR MOTOR

CROSS-REFERENCE TO RELATED APPLICATIONS

The present application claims priority under 35 U.S.C. § 119(a) of Austria Patent Application No. A50212/2021 filed Mar. 25, 2021, the disclosure of which is expressly incorporated by reference herein in its entirety.

BACKGROUND

1. Field of the Invention

Embodiments relate to a method for operating a transport system in the form of a long-stator linear motor comprising a stator on which a large number of magnetic-field-generating units is arranged and comprising a large number of transport units which are moved along the stator simultaneously. Embodiments also relate to a correspondingly designed transport system.

2. Discussion of Background Information

In a linear motor, a primary part (stator) is provided and a secondary part (mover) is provided which is arranged so as to be movable relative to the primary part. Magnetic-field-generating units are arranged on the primary part and drive magnets are arranged on the secondary part, or vice versa. The drive magnets are designed as permanent magnets, electrical coils or short-circuit windings. The magnetic-field-generating units can be designed as drive coils. Drive coils are electrical coils that are energized to generate an electromagnetic field by applying a coil voltage. However, the magnetic-field-generating units can also be designed as moving magnets (permanent magnets) in order to generate the electromagnetic field, for example as is described in EP 3 582 376 A1. Due to the interaction of the (electro)magnetic fields of the drive magnets and of the magnetic-field-generating units, forces act on the secondary part, which forces move the secondary part relative to the primary part. The linear motor can be designed, for example, as a synchronous machine or as an asynchronous machine. The magnetic-field-generating units of the linear motor are arranged either along a direction of movement or in a plane of movement. The secondary part can be moved along this one direction of movement or freely in the plane of movement in two directions of movement. A distinction can also be made between short-stator linear motors and long-stator linear motors, whereas in the long-stator linear motor, the secondary part is shorter or smaller than the primary part and in the short-stator linear motor, the primary part is shorter or smaller than the secondary part.

Long-stator linear motors are known from the prior art. In a long-stator linear motor, magnetic-field-generating units are arranged one behind the other in a direction of movement or in a plane of movement along a support structure. In the case of a planar motor, arrangements of the magnetic-field-generating units are also known in which magnetic-field-generating units are arranged on the stator in a plurality of planes, it being possible for the magnetic-field-generating units of one plane to be provided for one direction of movement. The magnetic-field-generating units arranged on the support structure form the stator of the long-stator linear motor, which stator extends in the movement space of the transport system. Drive magnets, either permanent magnets or electromagnets, are arranged on a mover and generate a magnetic excitation field. In a transport system, the mover functions as a transport unit for moving an object, for example. If the drive coils are energized in the region of a mover, an electromagnetic drive magnetic field is generated which interacts with the excitation field of the drive magnets to generate a driving force on the mover. The same can be achieved using the moving magnets as the magnetic-field-generating units. By controlling the energization of the drive coils or the movement of the magnets, a moving drive magnetic field can be generated, by of which the mover can be moved in the direction of movement or in the plane of movement of the long-stator linear motor. The advantage is that a large number of movers can be moved independently of one another on the stator simultaneously, it being possible to control the movements of the movers along the stator individually and independently of one another by a controller. For this purpose, the drive coils can be actuated individually for energization, or in groups. In this context, it is also known to construct a long-stator linear motor in a modular manner by stator modules. A particular number of magnetic-field-generating units (usually >1) is arranged on a stator module. Individual stator modules are then joined together to form a stator of the desired length and/or shape. For example, WO 2015/042409 A1 discloses such a modularly constructed linear long-stator linear motor. U.S. Pat. No. 9,202,719 B1 discloses a long-stator linear motor in the form of a planar motor comprising stator modules.

Due to the fact that the movers can be moved individually and independently of one another on the stator, providing collision avoidance is already known. The purpose of collision avoidance is to prevent an unwanted collision between two movers or between a mover and another part of the transport system, such as a part of a processing station provided on the transport system. Such collision avoidance can be found, for example, in EP 3 202 612 A1. For this collision avoidance, it is continuously checked whether a transport unit can perform a standstill maneuver with specified kinematics without running the risk of colliding with a transport unit traveling in front or with a stationary barrier. However, this presupposes that the collision monitoring system is aware of the current movements or the current positions of the transport units involved, in particular in the immediate vicinity. In addition, collision avoidance requires that the movers can be controlled at all. In an error scenario in which the positions of the movers are known but control of the movement of the movers is not possible, such collision avoidance also fails. In the event of an error of a transport system, for example an error in the transport unit and/or in the stator, in some cases no or only imprecise statements can be made about the current movement or position of a transport unit. In such a case, such collision avoidance can fail. Up to now, it was therefore customary to shut down the entire transport system in the event of an error and start it up again only after the error had been rectified. However, for obvious reasons, shutting down the entire transport system is often undesirable, in particular in large transport systems having long transport routes and a large number of transport units that are moved simultaneously (several hundred transport units are certainly possible). Failure of such a transport system also causes the interruption of all system parts connected to the transport system, such as processing stations or other transport systems, and should be avoided. That being said, troubleshooting can be complex if the error cannot be identified.

It is known from U.S. Pat. No. 9,806,647 B2 to transfer a transport system in the form of a long-stator linear motor to a safe state if an error is identified. The safe state can be shutting down the entire transport system, with the disadvantages mentioned above. Alternatively, an individual transport unit can be transferred to a safe state if it is defective. In the latter case, the safe state consists in de-energizing the drive coils in the region of the defective transport unit or generating a constant force by means of the drive coils in the region of the defective transport unit. However, such a safe state is insufficient because the other transport units are disregarded. Depending on the error, this can lead to critical situations with other transport units, such as collisions, which can cause more damage. If, for example, a liquid is transported in a container by a transport unit, said liquid could be spilled in a collision with another transport unit, which in turn can damage or even destroy the stator or the power electronics of the drive coils. Damage to a mover or a transported object is also possible. The consequential damage could thus be greater than the damage that would occur if the transport system were to be shut down. This approach is therefore considered insufficient.

SUMMARY

Embodiments relate to long-stator linear motors, which expressly include linear long-stator linear motors (with movement in a direction of movement) and planar long-stator linear motors (with movement in a plane of movement, often also called "planar motor"). In long-stator linear motors, a plurality of secondary parts are usually moved simultaneously and independently of one another along the primary part (in a direction of movement or in a plane of movement). Long-stator linear motors are therefore often used in electromagnetic transport systems in which a plurality of transport units (secondary parts) for carrying out transport tasks are moved simultaneously.

To address the deficiencies identified in the known art, when a system error occurs in the transport system, embodiments limit the impact of the system error in a transport system as far as possible without restricting the safety of the rest of the transport system.

According to embodiments, in an event of a system error in a part of the transport system, an error area is defined on the stator, whereas the error area includes only a part of the stator having the defective part of the transport system, and the magnetic-field-generating units within the error area are transferred to a specified error state. Thus, an error area is defined only locally on the transport system and only the drive coils within the error area are transferred to a specified error state. This ensures controlled, local error handling in the event of a system error. A complete shutdown of the entire transport system can thus be prevented as far as possible, as a result of which the availability of the transport system is increased. In the area of movement of the stator outside the error area, the transport units moved there can continue to move normally and in a manner unaffected by the error.

If a transport unit is within this error area or enters the error area due to its movement, it can be transferred to an error state in a controlled manner and in the process execute a defined error response movement. A transport unit therefore only responds to a system error if it is within the error area. In this case, the transport unit can carry out a controlled error response movement, which ensures controlled, local error handling of all transport units affected by the system error.

The error response movement can be generated in a simple manner in such a way that at least one drive coil is de-energized in the defined error area or at least one drive coil is short-circuited in the defined error area.

Likewise, the case of a transport unit leaving the error area can be dealt with in a controlled manner. If a transport unit leaves the defined error area, the error state of the transport unit that has left can be canceled or a further error area can be placed around the transport unit that has left. In this case, if an error in the first transport unit has been identified as the system error, the error area can advantageously be moved along with the movement of the first transport unit transferred to the error state. This means that the error can be kept locally around the moving transport unit, as a result of which the error influence can be limited locally on the stator.

If the error area is isolated from the rest of the area of movement of the stator by area barriers, so that no transport unit can enter or leave the error area, the region of the system error can be easily confined to a very specific part of the stator. The transport units outside the area barriers remain largely unaffected.

Embodiments are directed to a method for operating a transport system in the form of a long-stator linear motor including a stator on which a plurality of magnetic-field-generating units is arranged and a plurality of transport units which are moved along the stator simultaneously. The method includes, in an event of a system error in a part of the transport system, defining an error area on the stator that includes only a part of the stator with a defective part of the transport system, and transferring the magnetic-field-generating units within the defined error area to a specified error state.

According to embodiments, a first transport unit, which is one of within the defined error area or moved to enter the defined error area, can be transferred to an error state and executes a first defined error response movement.

In embodiments, one of: at least one drive coil as a magnetic-field-generating unit within the defined error area is de-energized, at least one drive coil as a magnetic-field-generating unit within the defined error area is short-circuited, or a movement of at least one moving permanent magnet as a magnetic-field-generating unit within the defined error area is stopped.

In accordance with other embodiments, if a second transport unit moving on the stator enters the defined error area, this second transport unit can be transferred to an error state and executes a second defined error response movement.

According to still other embodiments, if a transport unit leaves the defined error area, the method may further include expanding the error area so that the transport unit that left the defined error area is within the expanded error area. When expanding the error area, the method can further include checking whether, after expanding, there is a further transport unit within the expanded error area, and transferring the further transport unit within the expanded error area to an error state and executing a further defined error response movement.

In accordance with other embodiments, if a transport unit leaves the defined error area, the method can further include cancelling the error state of the transport unit left the defined error area.

In other embodiments, if a transport unit leaves the defined error area, a further error area may be placed around the transport unit that has left. The further error area can move with movement of the transport unit in the further error area.

According to other embodiments, the method can further include isolating defined error area from a rest of an area of movement of the stator by area barriers, so that a transport unit cannot enter or leave the defined error area.

In still other embodiments, the defined error area may be defined between two area sensors, and a transport unit entering the defined error area or a transport unit leaving the defined error area can be detected by an area sensor.

Embodiments are directed to a transport system in the form of a long-stator linear motor that includes a stator on which a plurality of magnetic-field-generating units is arranged; a plurality of transport units which are movable along the stator simultaneously; and a transport controller. In an event of a system error in a part of the transport system, an error area is defined on the stator that only includes a part of the stator having a defective part of the transport system, and the transport controller transfers magnetic-field-generating units within the error area to a specified error state.

In accordance with embodiments, the stator can include a plurality of stator segments, and at least one magnetic-field-generating unit can be provided on each stator segment. The defined error area may include at least one stator segment.

According to other embodiments, the stator may include a plurality of stator sections, and a plurality of magnetic-field-generating units are provided on each stator section. The defined error area may include at least one stator section.

In embodiments, the transport system may further include area sensors provided on the stator and the defined error area can be delimited between two area sensors. Via the area sensors delimiting the defined error area, a transport unit entering the defined error area or a transport unit leaving the defined error area can be detectable.

In accordance with still yet other embodiments, the transport system may further include area barriers provided on the stator, and the defined error area can be delimited between two area barriers. The area barriers delimiting the defined error area can prevent a transport unit from entering the defined error area or prevent a transport unit from leaving the defined error area.

Other exemplary embodiments and advantages of the present invention may be ascertained by reviewing the present disclosure and the accompanying drawing.

BRIEF DESCRIPTION OF THE DRAWINGS

The present invention is explained in more detail below with reference to FIG. 1 to 10, which schematically show advantageous embodiments of the invention by way of example and in a non-limiting manner. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
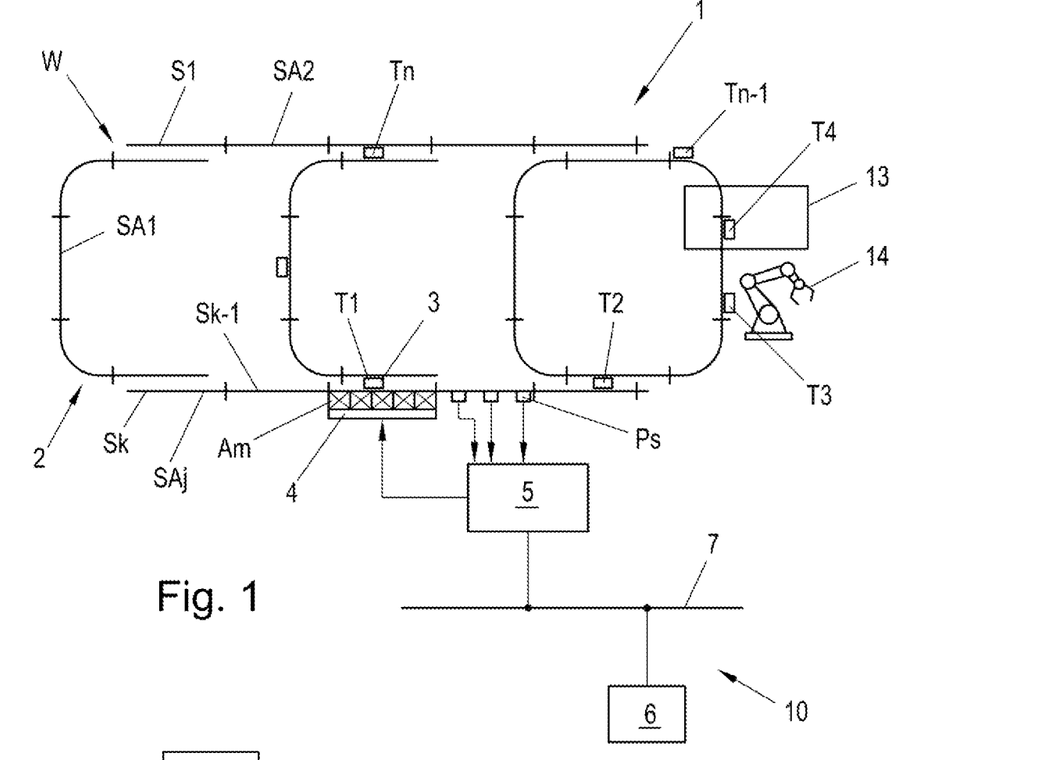
FIG. 1 shows a possible embodiment of a linear long-stator linear motor.
Figure 2:
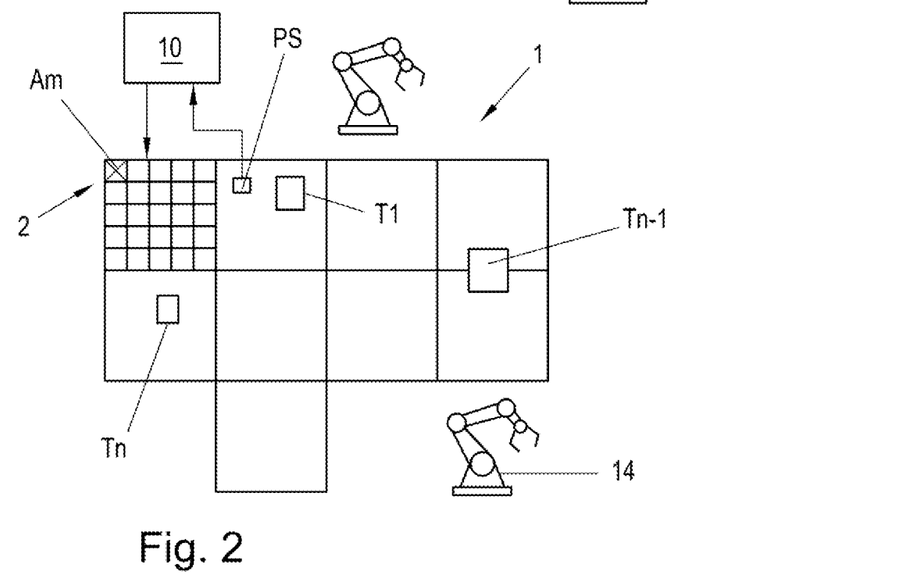
FIG. 2 shows a possible embodiment of a planar long-stator linear motor.

FIG. 1 shows an example of a design of a transport system 1 in the form of a linear long-stator linear motor, and FIG. 2 shows a planar long-stator linear motor. Since the invention is generally applicable to long-stator linear motors, a distinction is subsequently only made between linear and planar long-stator linear motors if it is necessary or useful for understanding. However, the structural design and the geometry of the stator 2 and of the transport unit 3 are of no importance for the invention and can in any case be designed as desired. For reasons of clarity, well-known guide structures for guiding a transport unit 3 along the stator 2 and/or for holding a transport unit 3 on the stator 2 are likewise not shown in the figures. Such guide structures can also be designed as desired. In the case of a planar long-stator linear motor, a transport unit 3 is usually guided magnetically.

The invention is described below using the specific example of a long-stator linear motor comprising drive coils Am on the stator 2 as magnetic-field-generating units. It should be noted, however, that instead of the drive coils Am, moving permanent magnets can also be provided on the stator 2 in order to generate the moving magnetic field, which interacts with a drive magnet arrangement 3 on the transport unit Tn. or other suitable magnetic-field-generating units for generating the moving magnetic field can also be provided. A mixture of different magnetic-field-generating units on the stator 2 is also conceivable in principle.

A long-stator linear motor includes a stator 2 and a large number of transport units Tn (with n>1), which can be moved along the stator 2. For the movement, drive coils Am (with m>1) are arranged on the stator 2, either one behind the other in a direction of movement (linear long-stator linear motor as in FIG. 1) or in a plane of movement (planar long-stator linear motor as in FIG. 2), with it also being possible to arrange the drive coils Am of a planar long-stator linear motor in a plurality of planes lying one above the other. For the sake of clarity, only a few of the drive coils Am are shown in the figures. However, it is known that the drive coils Am are arranged along the entire area of movement of the long-stator linear motor. A drive magnet arrangement 3, usually an arrangement of permanent magnets, is arranged on a transport unit Tn. This is also only implied in the figures for reasons of clarity. As is known, the drive magnet arrangement 3 and the drive coils Am are arranged such that an air gap of the motor is formed therebetween.

The stator 2 can be composed of individual stator segments Sk (with k>1), with a number of magnetic-field-generating units (drive coils Am, moving permanent magnets) being arranged on each stator segment Sk. The stator 2 can also be composed of individual stator sections SAj (with j≥1) (as in FIG. 1), which can be interconnected via switches W and form the stator 2. A stator section SAj can in turn be composed of a plurality of stator segments Sk.

The drive coils Am can be energized by applying a coil voltage and thus generate an electromagnetic field which interacts with the drive magnet arrangement 3 in order to generate a force and/or a torque acting on the transport unit Tn. This electromagnetic field can also be generated by another magnetic-field-generating unit, for example moving permanent magnets. This force can be generated in the direction of movement (in the planar case, two directions of movement are possible in the plane) and then serves as a propulsive force for moving the transport unit Tn. Rotation about an axis that is orthogonal to the plane of movement is also possible. However, it is also possible in this way to generate, in addition to the propulsive force, a force in a direction transverse to the propulsive force. Such a transverse force can be used, for example, in a design according to FIG. 1 in order to cause electromagnetic switch setting at a switch W (for example as described in EP 3 109 998 A1). In a design as in FIG. 2, such a transverse force can be used to levitate the transport unit Tn above the plane of movement and/or for rotation about an axis in the direction of a direction of movement. This operating principle of a long-stator linear motor is well known and so does not need to be discussed further here.

A processing station 13 can also be provided on the stator 2, in which station an object conveyed by a transport unit Tn can be processed (which includes any manipulation of the object). A handling device 14, for example a robot, can also be provided on the stator 2, for example in a processing station 13 or in the region of a processing station 13, which robot allows interaction with an object conveyed by a transport unit Tn, even while the transport unit Tn is moving.

In the case of a linear long-stator linear motor, it is also possible for drive coils Am to be arranged on both sides of the stator 2, as viewed in the direction of movement, and for the transport unit Tn to be moved therebetween (as indicated by the transport unit Tn in FIG. 1). If a drive magnet arrangement 3 is also provided on both sides of the transport unit Tn as viewed in the direction of movement, then by energizing the drive coils Am on both sides, forces (also different forces) acting on the transport unit Tn can also be generated on both sides simultaneously. With such an arrangement, switches W can in particular also be implemented on a linear long-stator linear motor, at which switches a transport unit Tn can be transferred from one transport route to another transport route. In such an embodiment of the transport system 1, the stator 2 would not be continuous, but would be composed of a plurality of stator sections, each of which forms a transport route. This is indicated in FIG. 1.

Power electronics 4 can be provided to generate the coil voltage of a drive coil Am. In order to be able to energize the drive coils Am in the desired manner, a control unit 5 is provided which controls the drive coils Am or the power electronics 4 accordingly. The control unit 5 is usually provided in the form of a plurality of distributed segment control units, each of which controls a number of drive coils. For this purpose, the segment control units can also be connected to one another and/or to a higher-level system control unit 6, for example via a data bus 7. In the system control unit 6, for example, the movement of the transport units Tn can be planned or specified, for example in the form of a speed profile as a function of the position on the stator 2. A collision monitoring for the transport units Tn can also be implemented in the system control unit 6. A control unit 5 can be provided in order to convert the specifications of the system control unit 6 for moving a transport unit Tn into coil voltages in order to produce the desired movement. However, this division into control unit 5 and system control unit 6 is only an example. In general, a transport control unit 10 is provided which controls the drive coils Am in order to produce the desired movements of the transport units Tn. However, how this transport control unit 10 is designed, for example in the form of a cascaded controller consisting of a plurality of interconnected control units as in FIG. 1, is irrelevant for the present invention.

In this case, a control unit can be microprocessor-based hardware on which control software is executed. However, the control unit can also be implemented as computer software that is installed and executed on available computer hardware. However, the control unit can also be designed as an integrated circuit, such as an application-specific integrated circuit (ASIC) or field programmable gate array (FPGA), on which a microprocessor can also be implemented. The control unit can also be implemented as an analog circuit, for example as an analog computer. Combinations of these are also possible.

In order to be able to determine the position of a transport unit Tn on the stator 2, position sensors Ps (with s>1) are usually also arranged on the stator 2, with only some of the position sensors Ps being shown in the figures, again for reasons of clarity. The position sensors Ps provide the detected position signals to the control unit 5. However, sensorless position detection can also be implemented in order to detect the position of a transport unit Tn. A closed control loop for controlling the position of a transport unit Tn in a closed-loop manner can also be implemented using a current position.

A position sensor Ps can detect a magnetic field of the transport unit Tn, for example the magnetic field that emanates from the drive magnet arrangement 3, or one that emanates from particular position magnets on the transport unit Tn. Such a position sensor Ps can be designed, for example, as a magnetostrictive sensor, magnetoresistive sensor or as a Hall sensor, although of course there are other types of sensors that are able to detect a magnetic field. However, position sensors Ps which detect a different physical variable are of course also conceivable, for example optical or inductive sensors.

However, the control of the movement of a transport unit Tn of a long-stator linear motor is also well known and requires no further explanation.

Different system errors, which can have different impacts, can occur in a transport system 1 in the form of a long-stator linear motor. A system error can affect a single transport unit Tn. Examples of such a system error include a tracking error (deviation between a setpoint and an actual value, for example for position, speed, coil current, propulsive force, of the closed-loop control of the movement of the transport unit Tn) that is too large, an encoder error (error in detecting the position, for example, if a position magnet on a transport unit is damaged or lost), or an operational error (hindering the movement of a transport unit). A system error can also affect a specific region of the transport system 1, in particular a part of the stator 2 (for example a stator segment or a track section). Examples of such a region error include an overtemperature at a location on the stator 2, a voltage supply error for a part of the stator 2, a network error in a region of the stator 2, an error in a processing station 13 or in a handling device 14 in which a part of the stator 2 is arranged, a mechanical error in the stator 2, etc. However, a system error only affects a part of the transport system 1. A system error that would affect the entire transport system 1, for example a global power failure or network failure, would inevitably lead to a shutdown of the entire transport system 1 and is therefore not the subject of the invention or would correspond to the previous error response in a transport system 1. System errors can be detected, for example, in the transport control unit 10, for example using the known setpoints and actual values of a transport unit Tn. However, system errors can also be detected by sensors on the transport system 1, for example using temperature sensors, voltage sensors, current sensors, light barriers, etc. It can be assumed that system errors and the location at which a system error occurred are detected on the transport system 1 and are known in the transport control unit 10.

However, a system error does not necessarily have to result in a transport unit Tn no longer being able to be moved. In any case, a system error means that a transport unit Tn can no longer be moved in the way in which it would be moved in normal operation (without a system error). Normal operation is a setpoint-controlled movement of the transport unit Tn. This means that the transport control unit 10 generates setpoints for the movement of the transport unit Tn and these setpoints can be implemented by energizing the drive coils Am in the region of the transport unit Tn with sufficiently small (specified or known) tracking errors. A common example of normal operation is a setpoint-position-controlled movement based on a setpoint for the position at each point in time of the closed-loop control of the movement, which setpoints are followed (with a permissible tracking error) by energizing the drive coils Am in the region of the transport unit Tn at each point in time of the closed-loop control of the movement. This can be implemented in the form of a closed-loop control, in which an actual value of the position can be detected or determined.

If a system error now occurs in a part of the transport system 1, an error area F is defined on the stator 2 which includes the defective part of the transport system 1. The error area F includes only the part of the stator 2 having the defective part of the transport system 1, and the drive coils Am within the error area F are transferred to a specified error state. The part of the stator 2 outside the error area F can continue to be operated in normal operation. It can also (or alternatively) be provided that a transport unit Tn which is located within this error area F is transferred to an error state and in the process executes a first defined error response movement. It can also (or alternatively) be provided that a transport unit Tn which is moved into the error area is transferred to an error state and in the process executes a first defined error response movement.

If a system error occurs at a transport unit Tn, an error area F is defined around the transport unit Tn. Due to the movement of the transport unit Tn, the error area F is moved along with the transport unit Tn in this case.

Figure 3:
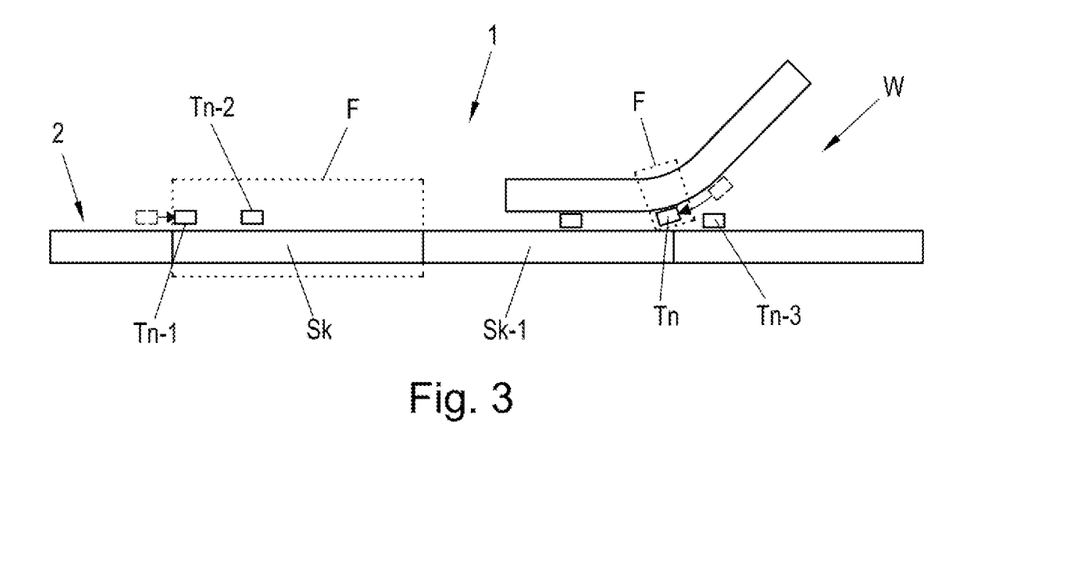
FIGS. 3 and 4 show possible error areas in the event of a system error.
Figure 4:
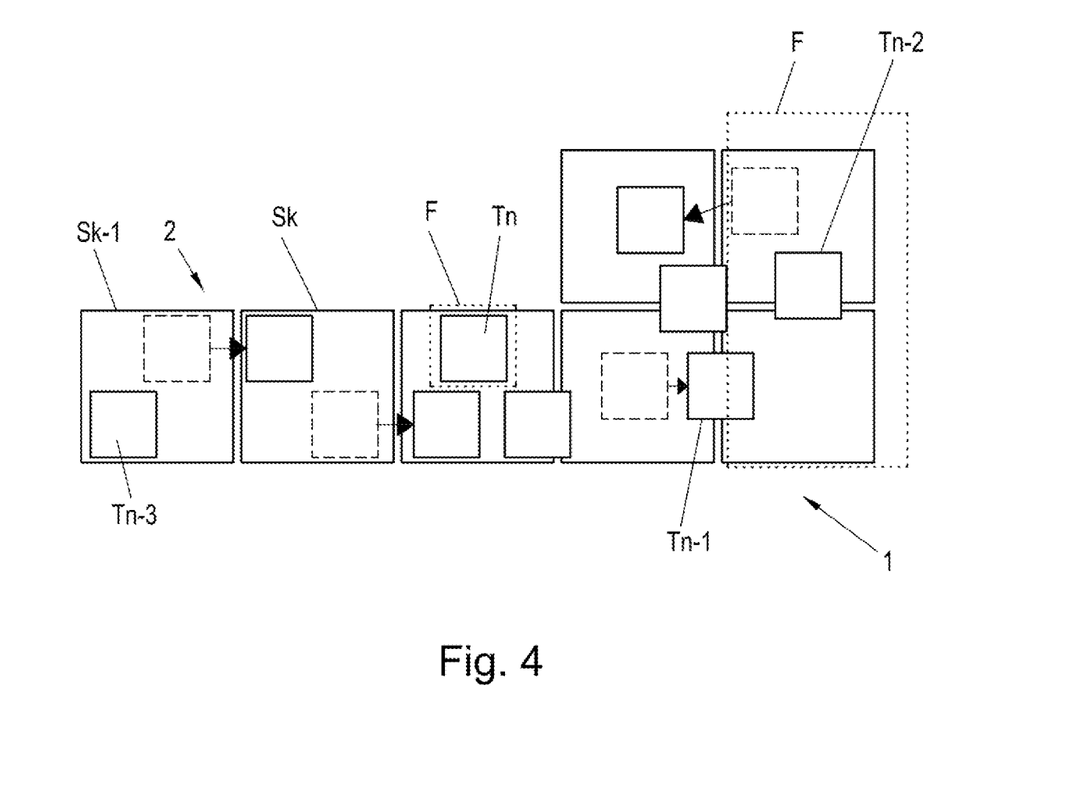

The error area F can depend on the system error, as explained with reference to FIGS. 3 and 4. If the system error relates to an error in the transport unit Tn, the error area F can be placed around the transport unit Tn. The error area F includes, for example, at least the region of the drive coils Am that are interacting with the transport unit Tn at the time the system error occurs, possibly also a number of drive coils Am upstream and downstream of the transport unit Tn. In FIG. 3, the transport unit Tn before the occurrence of the system error is shown in dashed lines with a movement arrow to indicate the movement of the transport unit Tn and the error area F. FIG. 3 shows a further system error which affects a part of the stator 2, for example an entire stator segment S. In this case, the error area F is placed around this defective system part. Such an error area F over a part of the stator 2 can also be defined if the actual position of a transport unit Tn can no longer be detected or can no longer be detected precisely. A transport unit Tn-1 which moves into this error area F can be transferred to an error state (in FIG. 3, the transport unit Tn-1 is shown in dashed lines with a movement arrow before entry into the error area F). A transport unit Tn-2 which is already within the error area when the system error occurs can also be transferred to an error state. Other transport units Tn-3 that are outside of an error area F are not affected by the system error and can continue to be moved normally. This means that only the part of the transport system 1 where the system error occurs is affected by the system error. The rest of the transport system 1 can continue to be operated normally. FIG. 4 shows this using the example of a planar long-stator linear motor.

It is, of course, possible for a number of system errors to occur simultaneously in a transport system 1 and therefore for a plurality of and different error areas F to be present. However, this does not change anything in the basic procedure according to the invention.

The error response movement can also depend on the system error. However, provision is made for a specific error response movement to be defined for every possible system error, which movement is then implemented by the transport control unit 10. However, a transport unit Tn does not necessarily have to move to a standstill as an error response movement.

If the system error affects, for example, a part of the stator 2, all the drive coils Am within the error area F can be de-energized. It would also be possible to short-circuit at least one of the affected drive coils Am within the error area F in order to implement an induction stop (short-circuit) for a transport unit Tn, as described in EP 3 581 428 A1, for example, as a result of which the transport unit Tn can be stopped more quickly. A transport unit Tn which is within the error area F would thus be forced to perform an error response movement. If the drive coils Am are de-energized, the transport unit Tn would coast without any driving force. In the event of a short circuit, a shorter standstill distance for the transport unit Tn could be achieved. However, the drive coils Am within the error area F can also be energized in a different way in order to cause, in any interaction with a transport unit Tn within the error area F, an error response movement of the transport unit Tn. In the case of moving permanent magnets as the magnetic-field-generating units, the movement of the permanent magnets within the error area F could be stopped. This would also cause a transport unit Tn to coast without power.

In the case of a system error, a distinction can also be made as to whether or not normal movement of the affected transport unit Tn is possible due to the system error. If, for example, an overtemperature occurs at the stator 2, the transport unit Tn can, for example, in principle be controlled setpoint-based, but can continue to be moved at a lower speed than in normal operation. The error response movement would thus be produced by reducing the speed. If a voltage failure occurs in a region of the stator 2, simply coasting the transport unit Tn (idling) without any driving force can be provided as an error response movement. In this case, an induction stop (short circuit) can also be implemented, as described for example in EP 3 581 428 A1, by means of which the transport unit Tn can be stopped more quickly. If, due to the system error, the setpoint (e.g., a setpoint position) of the movement of the transport unit Tn can no longer be followed, or can only be followed insufficiently or imprecisely, an actual-value-based controlled movement other than the above-mentioned short circuit, or the de-energization, or the stopping of the movement of the permanent magnets, can be implemented as the error response movement, in particular a movement of the transport unit Tn to a standstill, for example. This means that tracking errors that occur are ignored, but the transport unit Tn can be safely transferred to a desired state. Other or also further implemented error response movements according to a system error are of course also possible.

Due to the movements of the transport units Tn on the stator 2, situations can arise in which a further transport unit Tn+1 is moved into an error area F after the occurrence of a system error, or in which a transport unit Tn is moved out of an error area F. This is described in FIG. 5 to 8 using examples of movement sequences of transport units Tn, Tn+1.

Figure 5:
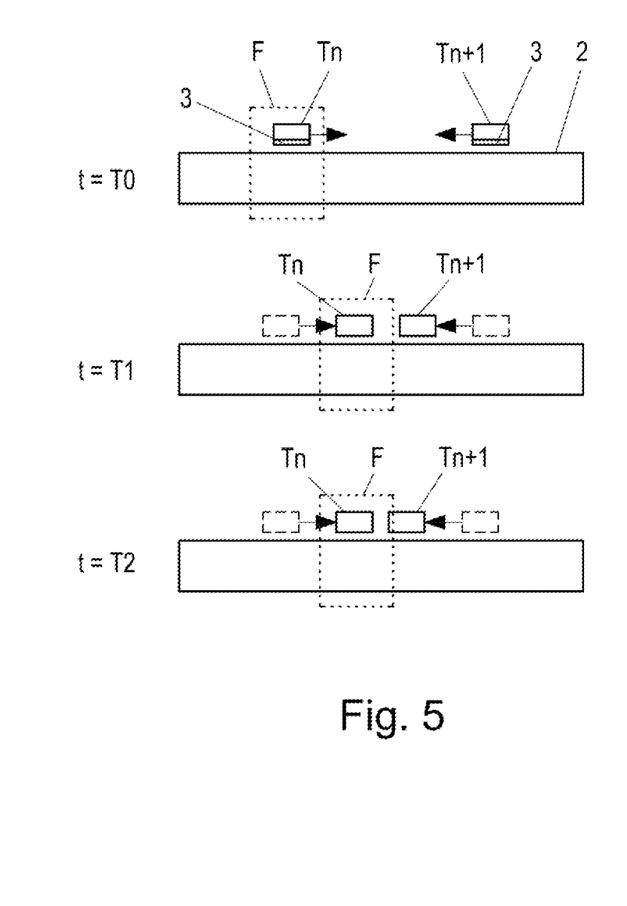
FIGS. 5 and 6 show a transport unit entering an error area.
Figure 6:
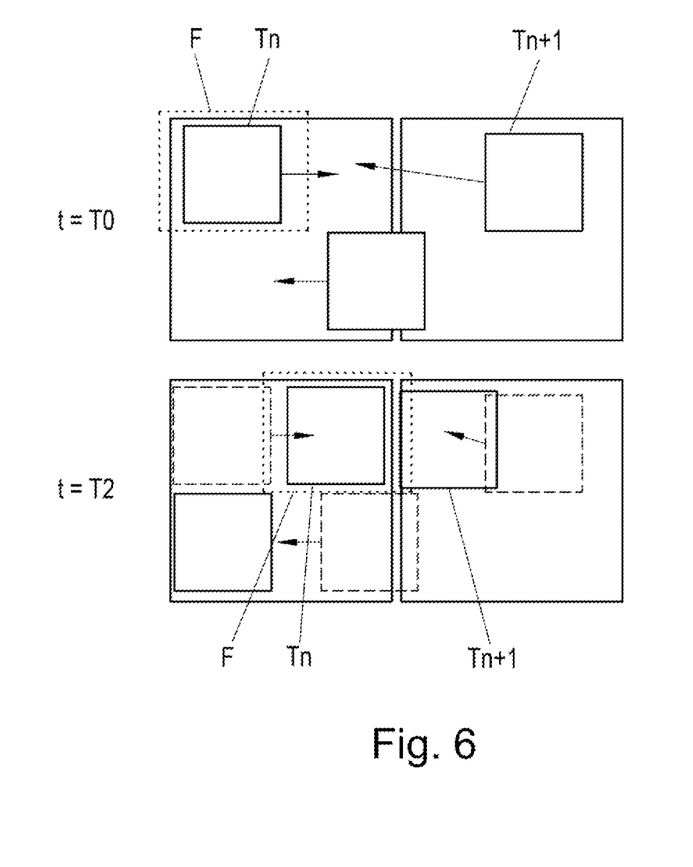

A movement sequence of two transport units Tn, Tn+1 is shown in FIG. 5. At time t=T0, a system error is detected and an error area F is placed around the first transport unit Tn. The error area F includes the drive coils Am, which interact with the transport unit Tn for movement. Since there is an error in the first transport unit Tn, the error area F is moved along with the defective transport unit Tn in this case (movement indicated by the movement arrow). Simultaneously, the second transport unit Tn+1 also continues to be moved (FIG. 5, middle, at time t=T1). At time t=T2 (FIG. 5, bottom) the second transport unit Tn+1 enters the error area F. The second transport unit Tn+1 is thus also transferred to an error state and executes a second defined error response movement. The second error response movement can be, for example, an emergency stop of the second transport unit Tn+1 in order to avoid a collision. However, the error response movement can also result from the state of the drive coils Am within the error area F, which can result from the error response movement of the transport unit Tn. FIG. 6 shows such a situation using the example of a planar long-stator linear motor at the two points in time T0 and T2.

It should be noted that it may not be possible to implement a setpoint-based or actual-value-based controlled movement of the second transport unit Tn+1 as the second error response movement, because it is possible that the drive coils Am in the region of the error area F may not be available, or may not be actuated, for the movement of the second transport unit Tn+1. In this case, however, at least coasting or an induction stop of the second transport unit Tn+1 could be possible.

Figures 7, 8:
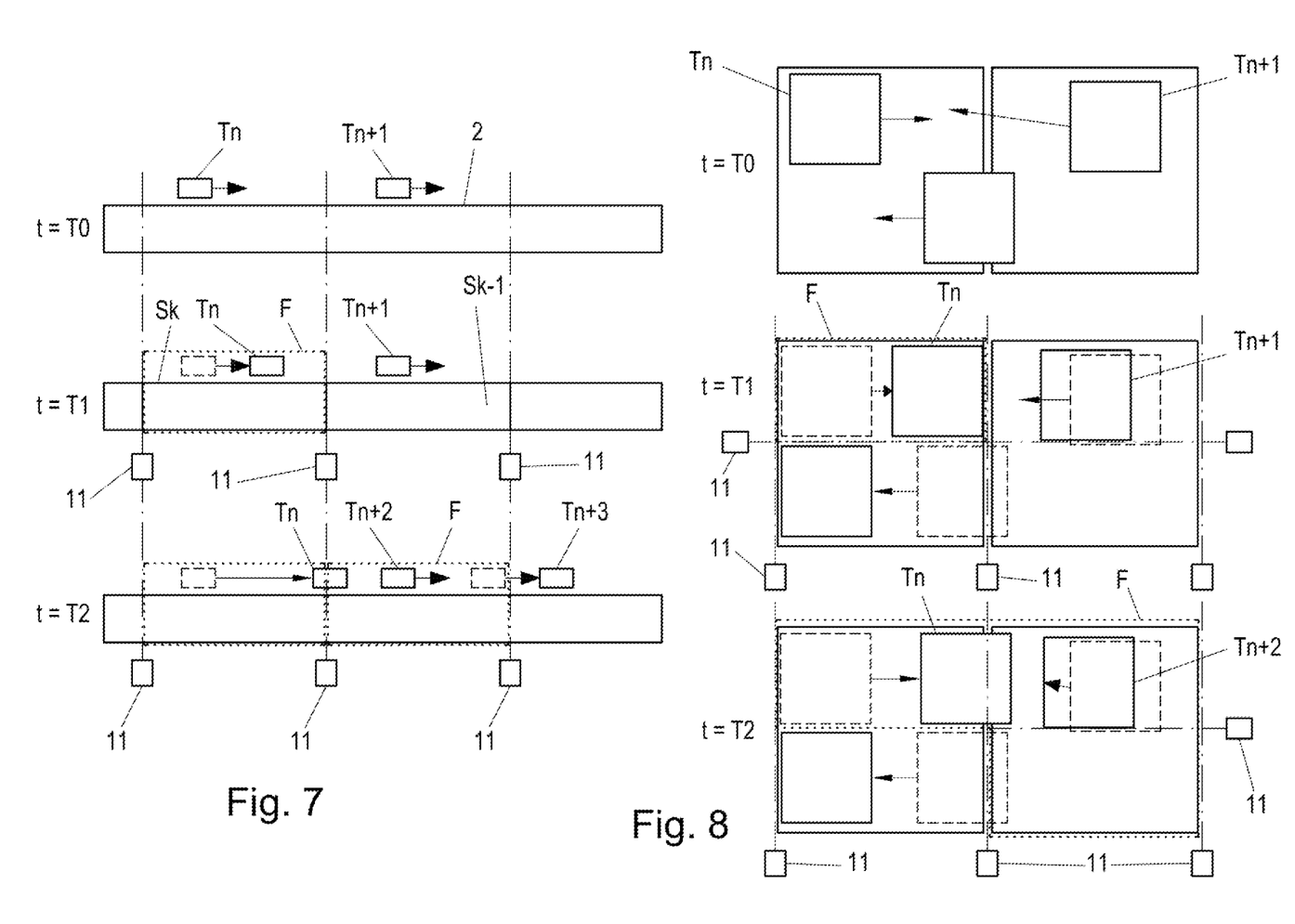
FIGS. 7 and 8 show an expansion of an error area.

In the example according to FIG. 7, a system error occurs at time t=T0, which in this case affects a part of the stator 2. An error area F is thus placed around this defective part (FIG. 7, center, at time t=T1), for example around an entire stator segment S or around a section on the stator 2. However, area sensors 11, for example light barriers, mechanical or magnetic switches, mechanical or magnetic sensors, inductive sensors, cameras, etc., can also be provided on the stator 2. In this case, the error area F can include the stator 2 between two adjacent area sensors 11 (as in the embodiment according to FIG. 7). If a first transport unit Tn is located within the error area F, it is transferred to an error state and executes the intended error response movement (FIG. 7, middle, at time t=T1).

The use of area sensors 11 can be useful in particular in the event of system errors affecting a system for detecting the position of the transport unit Tn (e.g., encoder error), since the position of the transport unit Tn can no longer be determined or can only be determined with insufficient accuracy. The area sensors 11 can be used to confine the error area F locally, because the exit or entry of a transport unit Tn into the error area can be detected via area sensors 11 independently of the position detection system.

If the first transport unit Tn reaches the limit of the defined error area F at time t=T2 (FIG. 7, bottom), the error area F can be expanded according to the system error, for example by a further part of the stator 2, such as the stator segment following in the direction of movement or the subsequent region up to the next area sensor 11 (as in FIG. 7). If the system error allows, for example if only a part of the stator 2 is defective but not the first transport unit Tn, then the error state of the first transport unit Tn can also be canceled again when the first transport unit Tn leaves the error area F. The error area F would not then have to be expanded. Thereafter, the first transport unit Tn could continue to be moved with normal movement. If the first transport unit Tn, or a further transport unit Tn+3 located within the error area F (as indicated in FIG. 7, bottom), leaves the error area F, a further error area F could also be placed around the leaving transport unit Tn (as described with reference to FIGS. 5 and 6).

If, due to its movement, the second transport unit Tn+1 enters the error area F, said unit would be transferred to the error state and would execute the defined second error response movement (for example as described above).

If the error area F is expanded due to the system error (as in FIG. 7, bottom), it is possible that a third transport unit Tn+2 is within the expanded error area F after the expansion. In this case, the third transport unit Tn+2 would be transferred to an error state and would execute a third defined error response movement. If the third transport unit Tn+2 moves out of the error area F, as described above for the first transport unit Tn, the error area F would be expanded again, or the error state of the third transport unit Tn+2 would be canceled, or an error area F would be placed around the third transport unit Tn+2.

FIG. 8 shows the expansion of the error area F, again using the example of a planar long-stator linear motor.

Figure 9:
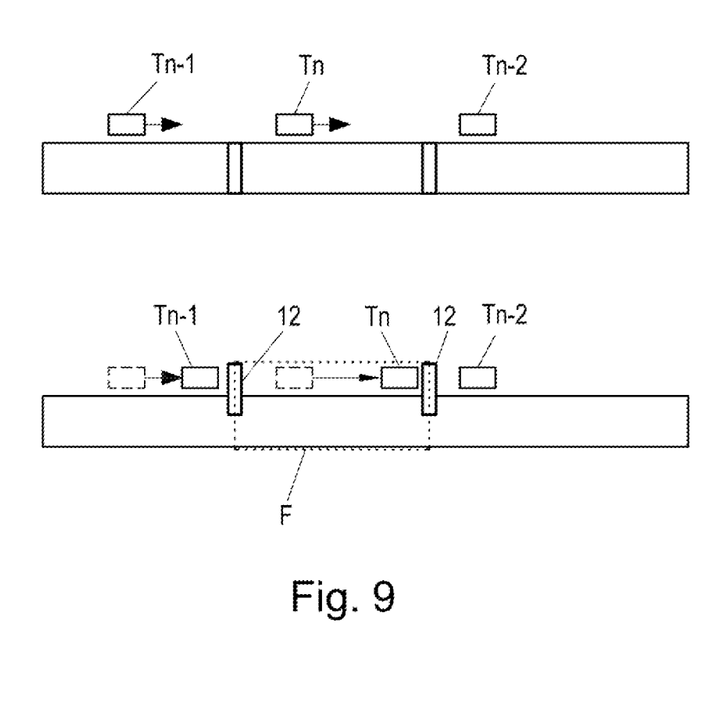
FIGS. 9 and 10 show the use of area barriers to isolate an error area.
Figure 10:
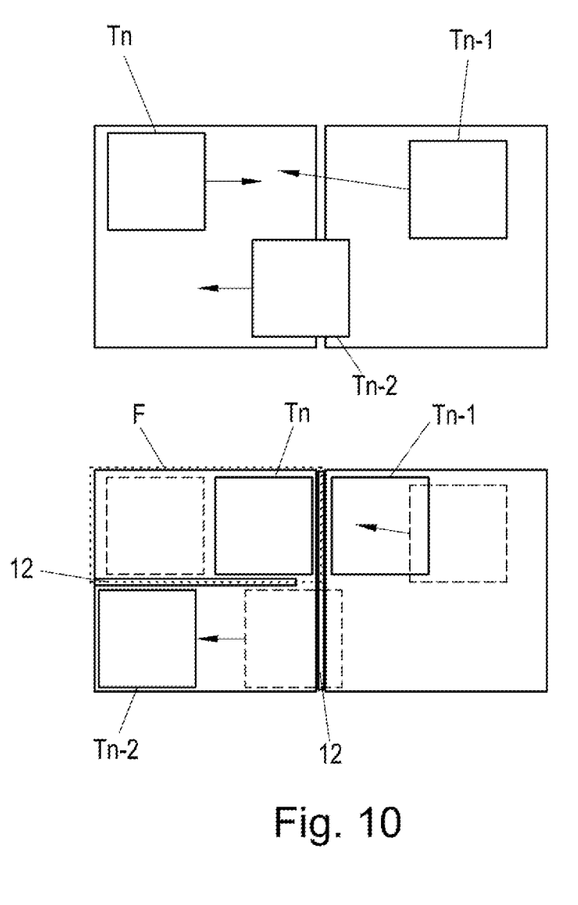

Instead of expanding the error area F, the region of the error area could also be separated from the remaining area of movement of the stator 2, as shown in FIGS. 9 and 10, for example. This separation can take place physically with area barriers 12, or also logically, for example in the transport controller 10. In the event of a system error, the error area F is defined between two provided area barriers 12, for example gates, walls, blocks, etc. The error area F is closed off to the outside (to the rest of the stator 2) by the area barriers 12. As described, a transport unit Tn within the error area F is transferred to the error state and executes the intended error response movement. Simultaneously, the area barriers 12 that physically separate the error area F from the rest of the area of movement of the stator 2 are activated. This means that the transport unit Tn in the error state cannot leave the error area F. Likewise, no other transport unit Tn−1, Tn−2 can enter the error area. Implemented collision avoidance can ensure that the other transport units Tn−1, Tn−2 do not collide with an area barrier.

The approach according to the invention of limiting the error area F locally also allows the following method for operating a transport system 1. The transport system 1 is in the form of a long-stator linear motor comprising a stator 2 on which a plurality of magnetic-field-generating units (drive coils Am, moving permanent magnets, etc.) is arranged and comprising a large number of transport units Tn which are moved along the stator 2 simultaneously. In the event of a system error in a part of the transport system 1, an error area F is defined on the stator 2, the error area F only including a part of the stator 2 having the defective part of the transport system 1, and a first transport unit Tn located within this error area F being transferred to an error state. A first defined error response movement is executed in the process. If a second transport unit Tn+1 moving on the stator 2 enters the defined error area F, this second transport unit Tn+1 is also transferred to an error state and in the process executes a second specified error response movement. If the first transport unit Tn or a further transport unit Tn+3 leaves the defined error area F, the error area F is expanded according to the system error, such that the first transport unit Tn or the additional transport unit Tn+3 is located within the expanded error area F, or the error state of the first transport unit Tn or the further transport unit Tn+3 is canceled, or a further error area F is defined around the leaving transport unit Tn, Tn+3. This further error area F does not have to correspond to the other error area in terms of its expansion; in any case, this further error area F is located at a different location of the stator 2.

In this case, if an error of the first transport unit Tn is identified as the system error, it is advantageous if the error area F is moved along with the movement of the first transport unit Tn transferred to the error state.

It is also advantageous, if the error area F is expanded, that it is checked whether a third transport unit Tn+2 is located within the expanded error area F after the expansion, and that the third transport unit Tn+2 that has entered the error area F as a result of the expansion is transferred to an error state and in the process executes a third defined error response movement, if the third transport unit Tn+2 leaves the defined error area, the error area F can be expanded according to the system error, such that the third transport unit Tn+2 is in the expanded error area F, or the error state of the third transport unit Tn+2 be canceled, or a further error area F around the third transport unit Tn+2 can be defined. This further error area F does not have to correspond to the other error area in terms of its expansion; in any case, this further error area F is located at a different location of the stator 2.

Area sensors 11 and/or area barriers 12 can also be used in this embodiment as described.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for operating a transport system in the form of a long-stator linear motor including a stator on which a plurality of magnetic-field-generating units is arranged and a plurality of transport units which are moved along the stator simultaneously, the method comprising:
   in an event of a system error in a part of the transport system, defining an error area on the stator that includes only a part of the stator with a defective part of the transport system, and
   transferring the magnetic-field-generating units within the defined error area to a specified error state,
   wherein, if a transport unit leaves the defined error area, the method further comprises one of:
      expanding the error area so that the transport unit that left the defined error area is within the expanded error area; or
      placing a further error area around the transport unit that has left the defined error area.

2. The method according to claim 1, wherein a first transport unit, which is one of within the defined error area or moved to enter the defined error area, is transferred to an error state and executes a first defined error response movement.

3. The method according to claim 1, wherein, one of:
   at least one drive coil as a magnetic-field-generating unit within the defined error area is de-energized,
   at least one drive coil as a magnetic-field-generating unit within the defined error area is short-circuited, or
   a movement of at least one moving permanent magnet as a magnetic-field-generating unit within the defined error area is stopped.

4. The method according to claim 1, wherein, if a second transport unit moving on the stator enters the defined error area, this second transport unit is transferred to an error state and executes a second defined error response movement.

5. The method according to claim 1, further comprising isolating defined error area from a rest of an area of movement of the stator by area barriers, so that a transport unit cannot enter or leave the defined error area.

6. The method according to claim 1, wherein, when expanding the error area, the method further comprises checking whether, after expanding, there is a further transport unit within the expanded error area, and transferring the further transport unit within the expanded error area to an error state and executing a further defined error response movement.

7. The method according to claim 1, wherein, if a transport unit leaves the defined error area, the method further comprises cancelling the error state of the transport unit that left the defined error area.

8. The method according to claim 1, wherein the defined error area is defined between two area sensors, and a transport unit entering the defined error area or a transport unit leaving the defined error area is detected by an area sensor.

9. The method according to claim 1, wherein the further error area moves with movement of the transport unit.

10. A transport system in the form of a long-stator linear motor comprising:
    a stator on which a plurality of magnetic-field-generating units is arranged;
    a plurality of transport units which are movable along the stator simultaneously; and
    a transport controller,
    wherein, in an event of a system error in a part of the transport system, an error area is defined on the stator that only includes a part of the stator having a defective part of the transport system,
    wherein the transport controller transfers magnetic-field-generating units within the error area to a specified error state, and
    wherein, if the transport unit leaves the defined error area, one of:
       the error area is expandable so that the transport unit that left the defined error area is within the expanded error area; or
       a further error area is placed around the transport unit that has left the defined error area.

11. The transport system according to claim 10, wherein the stator comprises a plurality of stator segments, and at least one magnetic-field-generating unit is provided on each stator segment, and
    wherein the defined error area comprises at least one stator segment.

12. The transport system according to claim 10, wherein the stator comprises a plurality of stator sections, and a plurality of magnetic-field-generating units are provided on each stator section, and wherein the defined error area comprises at least one stator section.

13. The transport system according to claim 10, further comprising area sensors provided on the stator, wherein the defined error area is delimited between two area sensors, wherein, via the area sensors delimiting the defined error area, a transport unit entering the defined error area or a transport unit leaving the defined error area is detectable.

14. The transport system according to claim 10, further comprising area barriers provided on the stator, wherein the defined error area is delimited between two area barriers, wherein the area barriers delimiting the defined error area prevent a transport unit from entering the defined error area or prevent a transport unit from leaving the defined error area.

15. A transport system in the form of a long-stator linear motor comprising:

a stator on which a plurality of magnetic-field-generating units is arranged;

a plurality of transport units which are movable along the stator simultaneously; and a transport controller, wherein, in an event of a system error in a part of the transport system, an error area is defined on the stator that only includes a part of the stator having a defective part of the transport system, wherein the transport controller transfers magnetic-field-generating units within the error area to a specified error state; and area barriers provided on the stator, wherein the defined error area is delimited between two area barriers, and wherein the area barriers delimiting the defined error area prevent a transport unit from entering the defined error area or prevent a transport unit from leaving the defined error area.

\* \* \* \* \*